United States Patent
Lea et al.

(10) Patent No.: US 10,435,318 B2
(45) Date of Patent: Oct. 8, 2019

(54) METHODS OF MAKING PURIFIED WATER FROM THE FISCHER-TROPSCH PROCESS

(71) Applicant: Velocys Technologies, Ltd., Milton Park (GB)

(72) Inventors: Graham Lea, Oxford Cluny (GB); Ivan Philip Greager, Houston, TX (US); Laura J. Silva, Dublin, OH (US)

(73) Assignee: Velocys Technologies, Ltd., Milton Park (GB)

( * ) Notice: Subject to any disclaimer, the term of this patent is extended or adjusted under 35 U.S.C. 154(b) by 668 days.

(21) Appl. No.: 14/855,327

(22) Filed: Sep. 15, 2015

(65) Prior Publication Data
US 2016/0075579 A1    Mar. 17, 2016

Related U.S. Application Data

(60) Provisional application No. 62/050,753, filed on Sep. 15, 2014.

(51) Int. Cl.
| | |
|---|---|
| *C02F 3/12* | (2006.01) |
| *C01B 5/00* | (2006.01) |
| *C02F 1/66* | (2006.01) |
| *C02F 1/20* | (2006.01) |
| *C02F 103/36* | (2006.01) |

(52) U.S. Cl.
CPC ............. *C02F 3/1268* (2013.01); *C01B 5/00* (2013.01); *C02F 3/1273* (2013.01); *C02F 1/20* (2013.01); *C02F 1/66* (2013.01); *C02F 2103/365* (2013.01); *C02F 2201/46115* (2013.01); *C02F 2305/06* (2013.01); *Y02E 50/343* (2013.01); *Y02W 10/15* (2015.05)

(58) Field of Classification Search
None
See application file for complete search history.

(56) References Cited

U.S. PATENT DOCUMENTS

| | | | |
|---|---|---|---|
| 7,147,775 B2 | 12/2006 | Kohler et al. | |
| 7,935,734 B2 | 5/2011 | Tonkovich et al. | |
| 8,720,725 B2 | 5/2014 | Abrams | |
| 9,023,900 B2 | 5/2015 | Wang et al. | |
| 2005/0131084 A1* | 6/2005 | Kohler | C02F 9/00 518/726 |

(Continued)

OTHER PUBLICATIONS

International Preliminary Examination Report dated Mar. 21, 2017 in PCT/US15/050297.

(Continued)

*Primary Examiner* — Patrick J Orme
(74) *Attorney, Agent, or Firm* — Frank Rosenberg

(57) ABSTRACT

The Fischer-Tropsch (FT) process creates significant amounts of water. This FT produced water contains significant amounts of organic impurities. The invention provides methods of treating FT produced water. Surprisingly, it was discovered that the FT produced water could be successfully treated in a membrane bioreactor (MBR) according to relatively simple and more efficient steps; for example, by adjusting the pH of the water in the range of 4.2 to 5.8 or treating the FT produced water in a stripper where the distillate product stream and a reflux stream returning to the stripper have the same composition. In a related aspect, water compositions are described.

20 Claims, 4 Drawing Sheets

(56) References Cited

U.S. PATENT DOCUMENTS

| | | | |
|---|---|---|---|
| 2005/0131086 A1 | 6/2005 | Dancourt et al. | |
| 2005/0165121 A1* | 7/2005 | Wang | B01J 19/0093 |
| | | | 518/726 |
| 2006/0194303 A1* | 8/2006 | DeWitt | C02F 3/34 |
| | | | 435/262 |
| 2008/0305539 A1 | 12/2008 | Hickey et al. | |
| 2009/0215139 A1 | 8/2009 | Datta et al. | |
| 2012/0055868 A1 | 3/2012 | Franzosi et al. | |
| 2012/0095268 A1 | 4/2012 | Tonkovich et al. | |
| 2012/0255903 A1* | 10/2012 | Kloos | B01D 61/16 |
| | | | 210/608 |
| 2013/0299334 A1 | 11/2013 | Carnelli et al. | |
| 2013/0305593 A1 | 11/2013 | Eizenga et al. | |
| 2014/0045954 A1 | 2/2014 | LeViness et al. | |
| 2014/0088206 A1 | 3/2014 | Daly et al. | |

OTHER PUBLICATIONS

Ahmadun, Fakhru'l-Razi, et al. "Review of technologies for oil and gas produced water treatment", J. Hazard Mater. 170 (2009), 530-551.

Altas, L. et al., "Sulfide removal in petroleum refinery wastewater by chemical precipitation", J. Hazard Mater. 153 (2008) 462-469.

Cooley, Heather et al., "Hydraulic Fracking and Water Resources: Separating the Frack from the Fiction", Pacific Institute, Editors Nancy Ross et al. Jun. 2012.

Dos Santos, A.B., Review paper on current technologies for decolourisation of textile wastewaters: Perspectives for anaerobic technology. Bioresource Technol. 98 (2007) 2369-2385.

El-Naas, M.H. et al. "Reduction of COD in refinery wastewater through adsorption on date-pit activated carbon" J. Hazard Mater. 173 750-757, (2010).

Leviness, Steve et al., "Improved Fischer-Tropsch Economics Enabled by Microchannel Technology", Velocys, Inc. 7950 Corporate Blvd., Plain City, Ohio 43064, USA (2011).

Ma, F., et al Application of bioaugmentation to improve the activated sludge system into the contact oxidation system treating petrochemical wastewater. Bioresource. Technol. 100 597-602.

International Search Report and Written Opinion of the International Searching Authority from International Application No. PCT/US2015/050297 dated Feb. 8, 2016.

Lea G. , et al, (2004) "Treatability Studies on Oil Shale Retort Sour Water", Presented at Ozwater '13, The Australian Water Association, Perth Australia.

* cited by examiner

METHODS OF MAKING PURIFIED WATER FROM THE FISCHER-TROPSCH PROCESS

RELATED APPLICATIONS

This application claims the benefit of U.S. Provisional Patent Application Ser. No. 62/050,753, filed 15 Sep. 2015.

INTRODUCTION

Exploration Wastewater

Oil exploration produces the largest volume of wastewater in the petroleum industry. This effluent, "produced water" (PW), results from the use of environmental waters such as seawater to displace the oil in the reservoir. See Table 0-1. PW contains many different chemical species which are onerous with respect to either their environmental impact or to abstraction operations, and technologies for their treatment are governed by a number of factors. Footprint is one of the important considerations when selecting treatment technologies. For instance, onshore installations where footprint is not critical, the relatively low-energy, simpler, high-footprint technologies can be employed. This may include the same biological treatment technologies commonly applied to other industrial effluents, including refinery and petrochemical effluents.

The ranges of concentration of the key constituents vary widely, and generally the exact composition with reference to the additives is not known and/or considered proprietary by the industry. Thus, whilst the biodegradability of the mineral oil components can be quantified, assessment of biodegradation of the additives can be challenging. The application of membrane bioreactor (MBR) technology to actual PW wastewaters (Table 0-2) appears to be still at the development stage (Kose et al., 2012; Pendashteh et al., 2012, Sharghi et al., 2013).

TABLE 0-1

PW quality from oil fields and gas fields, all in mg/L other than pH (Fakhru'l-Razi et al., 2009)

|     |     | COD | BOD | TSS | TDS | N—$NH_4$ | pH | Cl | Ca | $HCO_3^-$ | O&G[a] | Phenol |
|-----|-----|-----|-----|-----|-----|-----|-----|-----|-----|-----|-----|-----|
| Oil | Min | — | — | 1 | — | 10 | 4.3 | 80 | 13 | 77 | 2 | 0 |
|     | Max | 1,220 | — | 1,000 | — | 300 | 10 | 200,000 | 26,000 | 4,000 | 565 | 23 |
| Gas | Min | 2,600 | 75 | 8 | 2,600 | — | 3.1 | 1,400 | 9,400 | — | 2 | — |
|     | Max | 120,000 | 2,900 | 5,500 | 360,000 | — | 7 | 190,000 | 51,000 | — | 60 | — |

[a] O&G oil and grease

TABLE 0-2

Summary of MBR performance for treatment of petroleum wastewaters (Lin et al., 2012)

| Feed | Membrane | Flux LMH | Bioproc. config | $V_{reactor}$ L | $COD_{in}$ kg/$m^3$ | OLR kgCOD/$m^3 \cdot d$ | HRT h | SRT d | F:M kgCOD/kgVSS·d | MLSS g/L | T °C | % rem COD | Reference |
|---|---|---|---|---|---|---|---|---|---|---|---|---|---|
| PW | iHF, 0.1 μm | 10 | Ae | 5.1 | 1.5-3 | 13-26 | 2.7[b] | 30-"inf" | 0.25-0.45 | 2-16 | 20 | 67-83[a] | Kose et al, 2012 |
| PW analogue/ real | PVDF sMT, 200 kDa | 75-95[e] | Ae SBR | — | 0.56-6.8 | 0.28-3.4 | 24-96 | "inf" | 0.15-0.57 | 1.6-7.9 | 30 | 97-99[c] | Pendashteh et al., 2012 |
| Petro-chemical | PVDF iHF, 0.04 μm | 10-18 | Ax/Ae | 2,000/2,200 | 0.074-0.223 | 0.08-0.50 | 10.7-18.3 | 50-90 | 0.042-0.11 | 3.0-4.8 |  | 69-87 | Di Fabio et al., 2013 |
| Petro-chemical | iFS chlorin. PE, 0.4 μm | 10-12.5 | Ax/Ae | 18/30 | 0.720-1.59 | 0.9-3.0 | 13-16 | 25 | 0.12-0.23 | 8.6-9.6 | 26 | 85-95[d] | Qin et al., 2007 |
| Refinery | Ceramic sMT, 0.2 μm | 50-120[e] | Ae | 20 | 0.37-2.3 | 0.024-0.067 | 17-34 | — | — | 3-5.5 |  | ~94 | Rahman & Al-Malack, 2006 |
| Refinery | iHF | 15-17.5 | Ae | 4.4 | 0.4-1.05 | 0.74-1.72 | 10.0 | "inf" | 0.27-0.77 | 2.1-10.4 | ~25 | 41-67 | Viero et al, 2008 |
| Refinery | iFS PVDF 0.08 μm | — | An/Ax/Ae | — | 0.072-0.296 | — | — | — | — | — | 13-17 | 89-98 | Zhidong et al., 2009 |
| Oil-water analogue | sMT PVDF 15 kDa | 40-100[e] | Ae | 11 | 0.5-3 | 0.82-9.82 | 6.7-13.3 | — | 0.26 ± 0.54 g | 2.5-30 | 35 | 93-98[f] | Scholz and Fuchs, 2000 |
| PW | iFS chlorin. PE, 0.4 μm | — | Ae | 0.75 | 0.6-1.8 | 0.3-0.9 | 48 | 80 | — | 1.1-5.2 | 30 | 75-95 | Sharghi et al., 2013 |

[a] Generally 80-85% independent of $COD_{in}$
[b] Calculated from other reported data in publication
[c] Decreases to 90% on increasing salinity from 35 to 250 g/L
[d] Insignificant impact of HRT between 13 and 19 h on $COD_{out}$ (40-65 mg/L)
[e] Highly dependent on membrane fouling condition, TMP and CFV
[f] Other than at lowest OLR of 0.82 when removal was 77%

OLR Organic loading rate
HRT Hydraulic retention time
SRT Solids residence time
F:M Food/micro-organism ratio
MLSS Mixed liquor suspended solids concentration
chlorin PE Chlorinated polyethylene
PVDF Polyvinylidene difluoride
Ae Aerobic
Ax Anoxic
An Anaerobic
iFS Immersed flat sheet
sMT Sidestream multi-tube
iHF Immersed hollow fibre
"inf" "infinite" (no sludge wasting: SRT determined by sludge sampling)

Refinery Wastewaters

Refinery Wastewater Origins

Refineries use hydrocracking, hydro-treatment and thermal distillation to generate products from crude oil. Wastewater sources from the refining process include tank bottom draws, desalter effluent, sour water and spend caustic. These vary in composition both with respect to their origin and with time (Table 0-3).

Entrained water in the crude derives from the oil well extraction process and/or from ingress during transportation. It is typically removed as storage tank bulk solids and water (BS&W) or in the desalter, a key component of crude oil refining, and forms part of the wastewater. A significant effluent stream derives from where pre-softened or stripped sour water has been in contact with hydrocarbons. Wastewaters generated from operations from where no direct contact with hydrocarbons arises include residual water rejected from boiler feedwater pre-treatment processes: water produced from (i) regeneration of ion exchange resins in zeolite softeners and demineralisers, and (ii) blowdown (the concentrate stream) from cooling towers and boilers. There is also likely to be minor contamination of storm waters from run off, as well as minor flows from laboratory discharges, washing and sewage.

TABLE 0-3

Refinery effluent stream water quality, mg/L (IPIECA, 2010)

| Parameter | BS&W[a] | Desalter | Stripped sour water | Cooling tower blowdown |
|---|---|---|---|---|
| COD | 400-1,000 | 400-1,000 | 600-1,200 | 150 |
| Free HCs | Up to 1,000 | Up to 1,000 | <10 | <5 |
| SS | Up to 500 | Up to 500 | <10 | Up to 200 |
| Phenol | — | 10-100 | Up to 200 | — |
| Benzene | — | 5-15 | negligible | — |
| Sulphides | Up to 100 | Up to 100 | — | — |
| Ammonia | — | Up to 100 | — | — |
| TDS | High | High | Low | Intermediate |

[a]Tank bottom basic sediment and water

The principal water stream in a refinery is the cooling water (CW), which typically makes up about 50-55% of all the water in a refinery. At times CW can by-pass the WwTP to reduce its hydraulic loading, provided the CW quality is appropriate for discharge. If contamination from a leak is detected then CW is rerouted back to the WWTP. In addition, CW may be used for dilution of high-COD waters if they are otherwise by-passing the WWTP.

Refinery Wastewater Treatment

Refinery wastewater quality varies significantly temporally according to the process cycles. Its treatment is generally based on classical activated sludge treatment, usually with an initial flotation sequence to remove the oil. The simplest flotation device is the American Petroleum Institute (API) separator, the "workhorse" in any refinery for the separation of oil/water and solids, which allows both settable solids and large oil droplets (>150 μm) to be removed by up to 90%. This primary step is then often followed by clarification. This may comprise corrugated plate separators preceded by coagulation/flocculation and followed by either dissolved air flotation (DAF) or induced gas/air flotation (IGF/IAF). These technologies target much smaller oil droplets 10-25 μm and reduce the suspended oil concentration to around 25-50 mg/L.

Flotation, along with the increasingly employed electrocoagulation process, is most effective (in terms of % removal) for high suspended oil concentrations, such as those arising in the desalter and BS&W effluents. Such effluents, along with the spent caustic, also have a considerably higher salt content than the remaining effluent streams. It is therefore desirable to treat these three streams separately from the remaining low-TDS streams to allow both pre-treatment for oil removal and segregated biological treatment of high-TDS effluent. Since segregation is rarely employed significant shock loads arise in refinery effluents from dissolved salt and oil, in particular from sub-optimal electrical coalescence (grid technology) or intermittent discharge of the mud wash from the desalter.

Whereas biological treatment of PW is still at the developmental stage, it is routinely employed for refinery and petrochemical effluents (Ishak et al., 2012) where the application of MBRs has also been explored (Rahman and Al-Malack, 2006; Qin et al., 2007; Viero et al., 2008; Zhidong et al., 2010; Di Fabio et al., 2013). Data reported from these studies (Table 0-2) have indicated organic contaminant removals, expressed as chemical oxygen demand (COD), generally in the range of 84-99%, with fully optimised systems achieving >95% COD removal as well as complete nitrification (Qin et al., 2007; Zhidong et al., 2009; Di Fabio et al., 2013). Reported results indicate COD removals to vary little with the hydraulic retention time (Scholz and Fuchs, 2000; Pendashteh et al., 2012), but strongly dependent on the feedwater composition and, in the case of nitrification, pH: a decrease in pH levels to below 5.8 has been shown to reduce nitrification to as low as 80% (Zhidong et al., 2009). Biotreatment may also be enhanced by the addition of powdered activated carbon to the bioreactor, which helps retain the dissolved organic matter and thus extend the treatment time.

TABLE 0-4

Refinery effluent composition, mg/L (Diya'uddeen et al., 2011)

| pH[1] | COD | BOD | O&G | SS | $NH_3$ | Phenol | $S^{2-}$ | Reference |
|---|---|---|---|---|---|---|---|---|
| 7.0 | 300-600 | 150-360 | <50 | <150 | 15 | — | — | Ma et al., 2009 |
| 8.0 | 80-120 | 40 | 23 | 23 | — | 13 | — | Abdelwahab et al., 2009 |
| 6.6 | 600 | — | 120 | 120 | — | — | 890 | El Nass et al., 2009 |
| 8.4 | 220 | — | — | — | — | — | 22 | Alias & Büyükgüngör, 2008 |
| 6.5-7.5 | 170-180 | — | 420-650 | 420-650 | — | — | — | Saien & Nejati, 2007 |
| — | 300-800 | 150-350 | 100 | 100 | — | 20-200 | — | Al Zarooni & Eishorbagy, 2006 |
| 6.7 | 200 | — | — | — | 70 | 4 | — | Santos et al., 2006 |

TABLE 0-4-continued

Refinery effluent composition, mg/L (Diya'uddeen et al., 2011)

| $pH^1$ | COD | BOD | O&G | SS | $NH_3$ | Phenol | $S^{2-}$ | Reference |
|---|---|---|---|---|---|---|---|---|
| 8.0-8.2 | 850-1020 | 570 | — | — | 5-21 | 98-130 | 15-23 | Coelho et al., 2006 |
| — | 68-220 | 0-1 | — | — | 0.2-21 | 0.9-3.8 | — | Rahman & Al-Malack, 2006 |
| 8.1-8.9 | 510-910 | — | — | — | — | 30-31 | — | Jou & Huang, 2003 |
| 6.5 | 800 | — | 100 | 100 | — | 8 | 17 | Demirci et al., 1997 |
| 10 | 81 | 8 | — | — | 2.3 | — | — | Ojuola & Onuoha, 1987 |
| — | 660-710 | — | — | — | 22 | 30 | 10 | Serafim, 1979 |
| — | 300-600 | 150-250 | 100-300$^2$ | — | — | 20-200 | | World Bank Group, 1999 |

$^1$unitless,
$^2$desalter effluent

Whilst biological treatment is the most common and cost effective method for organics removal employed at oil refineries, the required treated water, which for discharge is normally between 100 and 200 mg/L COD (Ma et al., 2009; Santos et al., 2006), may be challenged by both nitrification inhibition and by the biorefractory nature of the organic fraction. A loss of nitrification can arise both from a C:N imbalance or from toxicity. In such cases where biological treatment is challenged, advanced oxidation may be necessary (Coelho et al., 2006; Saien and Nejati, 2007; Abdel-wahab et al., 2009) and its implementation within the sector is becoming increasingly common.

Petrochemical effluents tend to be less challenging than refinery effluents, due to their reduced recalcitrance and water quality fluctuation. An exception is effluents containing Polyvinyl alcohol (PVA) from polyvinyl chloride (PVC) manufacture, which are relatively resistant to biodegradation and thus require a high MLVSS (mixed liquor volatile suspended solids) concentration and long treatment times. This makes such effluents very conducive to treatment by MBR technology, particularly in cases where spatial restrictions exist.

In a 2012 publication, Lin et al. reviewed various literature reports of MBRs applied to the treatment of industrial wastewater. Lin et al.'s description of the MBR process includes the reactor configurations illustrated in FIG. 1.

FT (Fischer Tropsch) Produced Water

The effluent produced from FT process contains dissolved organic matter (principally oxygenates such as alcohols, carboxylic acids, ketones, aldehydes) as contaminants. It results from the Fischer Tropsch (FT) reaction between CO and $H_2$, which generates water as a product along with long, straight chain (alkanes) hydrocarbons (syn-crude). Inorganic minerals and nitrogen are at low levels, and other minor contaminants comprise BTEX benzene, toluene, ethyl-benzene and xylene and alkanes (hydrocarbon oil).

Few studies have been conducted of efficacy of biological treatment of FT produced water, and almost none using MBR technology. Evidence from published studies (Table 3-1) suggest that the effluent is highly biodegradable with >99% removal of chemical oxygen demand (COD) attainable from feedwaters containing as much as 2,000 mg/L COD. However, operation and maintenance data, sludge characterisation, and overall information pertaining to process efficacy is scant.

In WO 03/106351, Sasol Technology described a method purifying Fischer-Tropsch derived water. This method comprises a first step of anaerobic digestion, followed by increasing pH in the range of between 5.5 and 9.5 during a second step of aerobic treatment in an MBR. Further purification may be conducted in a tertiary treatment stage and dissolved salts are removed to produce the purified water. This process is too lengthy, expensive and energy consuming.

SUMMARY OF THE INVENTION

In a first aspect, the invention provides a method of treating water produced by a Fischer-Tropsch (FT) process, comprising: obtaining water produced by a Fischer-Tropsch process having a pH of 5.0 or less and having carboxylic acids and alcohols dissolved in the water; adding sufficient alkalinity to the water to ensure that the pH of the water is in a range of 4.2 to 5.8; adding at least a portion of the water having a pH in the range of 4.2 to 5.8 to a MBR wherein the water is treated with oxygen by aeration in the presence of bioorganisms to reduce the concentration of organic carbon in the water, thus resulting in purified water; and removing at least a portion of the purified water from the MBR.

In various preferred embodiments, this inventive method can have one or any combination of the following additional features: conducting the FT process in a fixed-bed reactor with cobalt-based catalyst; conducting the FT process with a short contact time in the range of 50-2,000 milliseconds; conducting the FT process in a microchannel reactor; subjecting the water produced in the FT process to a stripping operation prior to the step of adding sufficient alkalinity (typically by adding hydroxide); wherein just prior to adding the sufficient alkalinity, the pH of the water is in the range of 2.0 to 4.1, or in the range of 3.5 to 4.0; wherein the alkalinity comprises NaOH, or KOH, or $Na_2CO_3$ or $K_2CO_3$; wherein sufficient alkalinity is added to the water to ensure that the pH of the water is in a range of 4.5 to 5.5 or in the range of 4.7 to 5.3; wherein the flow regime of the water through the MBR is mixed and not principally (either as a function of residence time or by volume) plug flow; wherein the purified water resulting from the process can be used without reverse osmosis; wherein the purified water resulting from the process is used without reverse osmosis or any other further treatment, such as any further treatment to remove dissolved salt; wherein the process does not result in any salty brine; wherein the purified water resulting from the process, without further treatment, is used to cool a process stream in a cooling tower; and/or wherein the process operates in a continuous operating mode with the addition of nutrients and removal of excess sludge.

The purified water can be recycled for other uses in the facility, including adding the water as a component of the feed for reforming reactions (e.g. steam reforming, or autothermal reforming), steam cracking, saturation of gas streams, sent to a cooling tower for use as a process coolant stream, in irrigation, upgrading to boiler feed or used for other oil and gas production uses, including enhanced oil recovery or fracturing oil or gas formations (fracking). Alternatively, the purified water may be disposed as waste water or sent to municipal water treatment. The purified water may be further purified in a polishing step such as using activated carbon absorption. The invention includes use of the purified water in any of the applications mentioned here.

Mixing for the MBR is preferably obtained by aeration, and/or, especially in tanks that are not round or cylindrical, stirring and/or recirculation pumps. Plug flow is not desirable since it will create a pH gradient that is harmful to the bacteria in the MBR. Preferably, the Peclet number for the complete mixing in a mixed reactor is be greater than 0.1, more preferably greater than 1, more preferably greater than 10.

Typically, all of the water having pH adjusted to be in the range of 4.2 to 5.8 is added to an MBR; and all of the water is removed from the MBR with the pH range of 6.5 to 8.0. In some preferred embodiments, the process is conducted in a continuous fashion. In the inventive process, MBRs preferably include an aerobic reactor and membrane(s) to trap solids.

The invention also includes an aqueous composition made by the process described above. The total dissolved salts in the aqueous composition (typically a stream) are typically in the range 100 to 300 mg/l.

In another aspect, the invention provides an aqueous composition, comprising TDS of 100 to 300 mg/l; 90 mass % or more of the dissolved salts are sodium bicarbonate or potassium bicarbonate; TSS of less than 5 mg/l; TOC of less than 10 mg/l; COD of less than 50 mg/l; 30 minute chlorine demand of less than 5 mg/l; pH in the range of 6.5 to 8.0; hardness of less than 50 mg/l as $CaCO_3$; and wherein the carbon in the aqueous composition is significantly derived from fossil sources as determined by having a 14C/12C ratio that is $1.0 \times 10^{-12}$ or less, preferably $0.6 \times 10^{-12}$ or less. Measurements for these variables are either described in this specification and/or well known and commercially available.

The aqueous solution preferably contains 50 mg/l or less of alkali or 40 mg/l or less of alkali, in some embodiments, in the range of 10 to 50 mg/l, or in the range of 20 to 40 mg/l. In some embodiments, the aqueous solution has 150 to 300 mg/l TDS. In some embodiments, the aqueous solution has a TSS of 0.1 to 5 mg/l, or 1 to 5 mg/l. In some embodiments, the aqueous solution has a TOC of 1.0 to 10 mg/l; or 2.0 to 8 mg/l; preferably comprising alcohols, carboxylic acids and polysaccharides. In some embodiments, the aqueous solution has a COD of 1.0 to 50 mg/l; or 5.0 to 50 mg/l; or 2.0 to 40 mg/l; or 1.0 to 15 mg/l or 5.0 to 15 mg/l. In some embodiments, the aqueous solution has a hardness of 1 to 50, or 5 to 50, or 2 to 40 mg/l as $CaCO_3$. In some embodiments, the aqueous solution has a chlorine demand of 0.1 to 5 mg/l, or 0.5 to 5 mg/l.

These compositions (mentioned above) may result from the methods of the present invention.

These aqueous compositions are suitable for use as cooling tower make-up after dosing with biocides such as chlorine, and corrosion inhibitors, as per normal operation of cooling water systems. No further removal of TOC or TDS is required, and the low TDS of the treated effluent allows the cooling tower to operate with numerous cycles of concentration, up to a maximum of 12. The low concentration of organics on the effluent helps reduce the growth of biofilms on the cooling system packing and pipework.

In a further aspect, the invention provides a method of purifying water created via Fischer-Tropsch synthesis, comprising: providing a first volume of FT produced water having a COD of at least 4000; passing the FT produced water into a stripper where the water is contacted with a vapor or gas that removes an organic fraction into an overhead stream (118) which is cooled to condense an overhead liquid stream; and b) separating the overhead liquid stream into a distillate product stream (124) and a reflux stream (125) and the distillate product stream and the reflux stream have the same composition; or condensing the effluent from the top of the stripper in a condenser (118) to form a liquid wherein the liquid phase condensed in the condenser is a single phase; and passing the bottoms liquid fraction (126) to further processing.

In various preferred embodiments, the invention can have one or any combination of the follow features: wherein the distillate product stream and the reflux stream have the same composition; wherein the products from the stripper are limited to a distillate product stream, a bottoms liquid fraction and, optionally, a vapor overhead fraction; wherein the recovery of alcohols in the distillate product stream is greater than 90% (or greater than 95%) of the alcohols in the feed stream (112); wherein the alcohol content in the bottoms liquid fractions is less than 100 ppm (or less than 50 ppm); wherein the stripping is accomplished by the addition of live steam (116); wherein the bottoms liquid in the stripper is indirectly heated with a reboiler; comprising passing at least a portion of the bottoms liquid fraction (126) from the stripper to an MBR wherein microorganisms consume organics in the water, and removing a second volume of purified water from the MBR; wherein the second volume is at least 90% of the first volume and wherein the purified water has a COD of 50 mg/L or less, preferably 1 to 15 mg/L, or 5-15 mg/L; wherein the process steps consist essentially of providing a first volume of FT produced water having a COD of at least 4000; passing the FT produced water into a stripper where the water is contacted with a vapor or gas that removes an organic fraction into an overhead stream (118) which is cooled to condense an overhead liquid stream; and (b) separating the overhead liquid stream into a distillate product stream (124) and a reflux stream (125) and the distillate product stream and the reflux stream have the same composition; or condensing the effluent from the top of the stripper in a condenser (118) to form a liquid wherein the liquid phase condensed in the condenser is a single phase; and passing at least a portion of the bottoms liquid fraction (126) from the stripper to an MBR wherein microorganisms consume organics in the water, and removing a second volume of purified water from the MBR; wherein the second volume is at least 90% of the first volume and wherein the purified water has a COD of 50 mg/L or less, preferably 1 to 15 mg/L, or 5-15 mg/L; where the FT produced water is made in a process comprising: passing syngas into a fixed bed, Co catalyst-containing FT reactor at a contact time in the range of 50-2,000 ms, preferably 100-500 ms, and a temperature in the range of 170-230 C (or 180-220 C; or 190-210 C), preferably where the fixed bed is operated isothermally, within a 5 C (2 C) temperature differential; wherein the pH of the bottoms liquid fraction is adjusted to a pH in the range of 4.5 to 5.5 prior to addition to the MBR; where pH is adjusted by addition of NaOH or KOH; wherein a nutrient mix comprising: N, Mo, Cu, Co, Ni, Mn, Zn, Fe, P, Mg, K, S, and Ca is added to the MBR; and wherein purified water is removed from the MBR in a pH range of 6.5 to 8.0

In any of the inventive methods, the FT produced water comprises one or any combination of the following characteristics: an alcohol to acid molar ratio of at least 15:1, or at least 25:1, or in the range of 15:1 to 200:1, or 25 to 250, or 25 to 200; or 25 to 100; or 30 to 70; and/or where the combined mass of methanol and ethanol comprises at least 70%, or at least 80%, or in the range of 70 or 75 to about 90% of the total mass of C1 to C10 mono-hydroxy alcohols; or where the combined mass of methanol and ethanol comprises at least 50%, or at least 60%, or in the range of 60 or 65 to about 85% or 90% of the total mass of the following: acetone, methyl ethyl ketone, diethyl ketone, benzene, toluene, xylenes, styrene, acetaldehyde, formic acid, acetic acid, propionic acid, butyric acid, valeric acid, hexonoic acid, methanol, ethanol, propanol, n-butanol, n-pentanol, n-hexanol, n-heptanol, n-octanol, n-nonanol, and n-decanol; or where the combined mass of methanol, ethanol and propanol comprises at least 55%, or at least 65%, or in the range of 70 or 75 to about 85% or about 90% of the total mass of the following: acetone, methyl ethyl ketone, diethyl ketone, benzene, toluene, xylenes, styrene, acetaldehyde, formic acid, acetic acid, propionic acid, butyric acid, valeric acid, hexonoic acid, methanol, ethanol, propanol, n-butanol, n-pentanol, n-hexanol, n-heptanol, n-octanol, n-nonanol, and n-decanol. It is believed that we have discovered that these characteristics make the water compositions particularly amenable to simple stripping operations. For example, there is no need for a heavy alcohol side-draw (propanol or butanol and heavier) that would otherwise phase split from the aqueous phase in the stripper tower.

In any of these characteristics, the amounts of alcohols and acids are based only on compounds containing 10 or fewer carbon atoms, which, in any case, make up the vast majority of moles of alcohols and acids in the water phase.

In another aspect, the invention provides a method of purifying water created via Fischer-Tropsch synthesis, comprising (or consisting essentially of): providing a first volume of FT produced water having a COD of at least 4000 and any characteristic or combination of characteristics mentioned above; passing the FT produced water into a stripper where the water is contacted with a vapor or gas that removes an organic fraction into an overhead stream (118) which is cooled to condense an overhead liquid stream; and passing at least a portion of the bottoms liquid fraction (126) from the stripper to an MBR wherein microorganisms consume organics in the water, and removing a second volume of purified water from the MBR; wherein the second volume is at least 90% of the first volume and wherein the purified water has a COD of 50 mg/L or less, preferably 1 to 15 mg/L, or 5-15 mg/L.

As is conventional, the phrase "consisting essentially of" means that the method does not include additional steps that materially affect the claimed process. For example, in this case, this means that the process does not include a separate evaporator treatment, or a side draw from the stripper, or a series of strippers or MBRs.

Glossary

LIST OF ABBREVIATIONS

| | |
|---|---|
| AMS | Ammonium sulphate |
| API | American Petroleum Institute |
| BS&W | Bottom sediment and water normally bulk solids and water (in oil) |
| BTEX | Benzene, toluene, ethylbenzene, xylene |
| COD | Chemical oxygen demand |
| TOC | Total organic carbon |
| TDS | Total dissolved solids |
| CW | Cooling Water |
| DO | Dissolved Oxygen |
| F:M | Food to micro-organism mass ratio |
| FT | Fischer Tropsch |
| GTL | Gas to liquids |
| HRT | Hydraulic retention time |
| KOH | Potassium hydroxide |
| MBR | Membrane bioreactor |
| iHF | Immersed hollow fibre |
| iFS | Immersed flatsheet |
| MLSS | Mixed liquor suspended solids |
| NaOH | Sodium hydroxide |
| PVA | Polyvinyl alcohol |
| PVC | polyvinyl chloride |
| RO | Reverse osmosis |
| PW | Produced Water |
| SRT | Sludge retention time |
| TSS | Total suspended solids |
| WWTP | Wastewater treatment plant |
| WAS | Waste activated sludge |

GAC is granulated activated carbon.

FCV is fluid control valve.

TPH is total petroleum hydrocarbons

The term "contact time" refers to the volume of the reaction zone within the microchannel reactor divided by the volumetric feed flow rate of the reactant composition adjusted to a temperature of 0° C. and a pressure of one atmosphere.

Stripping is a process in which a vapor or gas stream is contacted with a liquid process fluid in order to selectively decrease the concentration of (and/or recover) one or more solutes in the process fluid. Typically, the recovered solutes comprise gases or compounds that have relatively high solubility in the stripping gas(ses). Preferably, this contacting is conducted in a vessel with packing or trays, and may be conducted with counter-current contacting of the vapor and or gas with the liquid process fluid.

DETAILED DESCRIPTION OF THE INVENTION

Figures 1A, 1B, 1C:
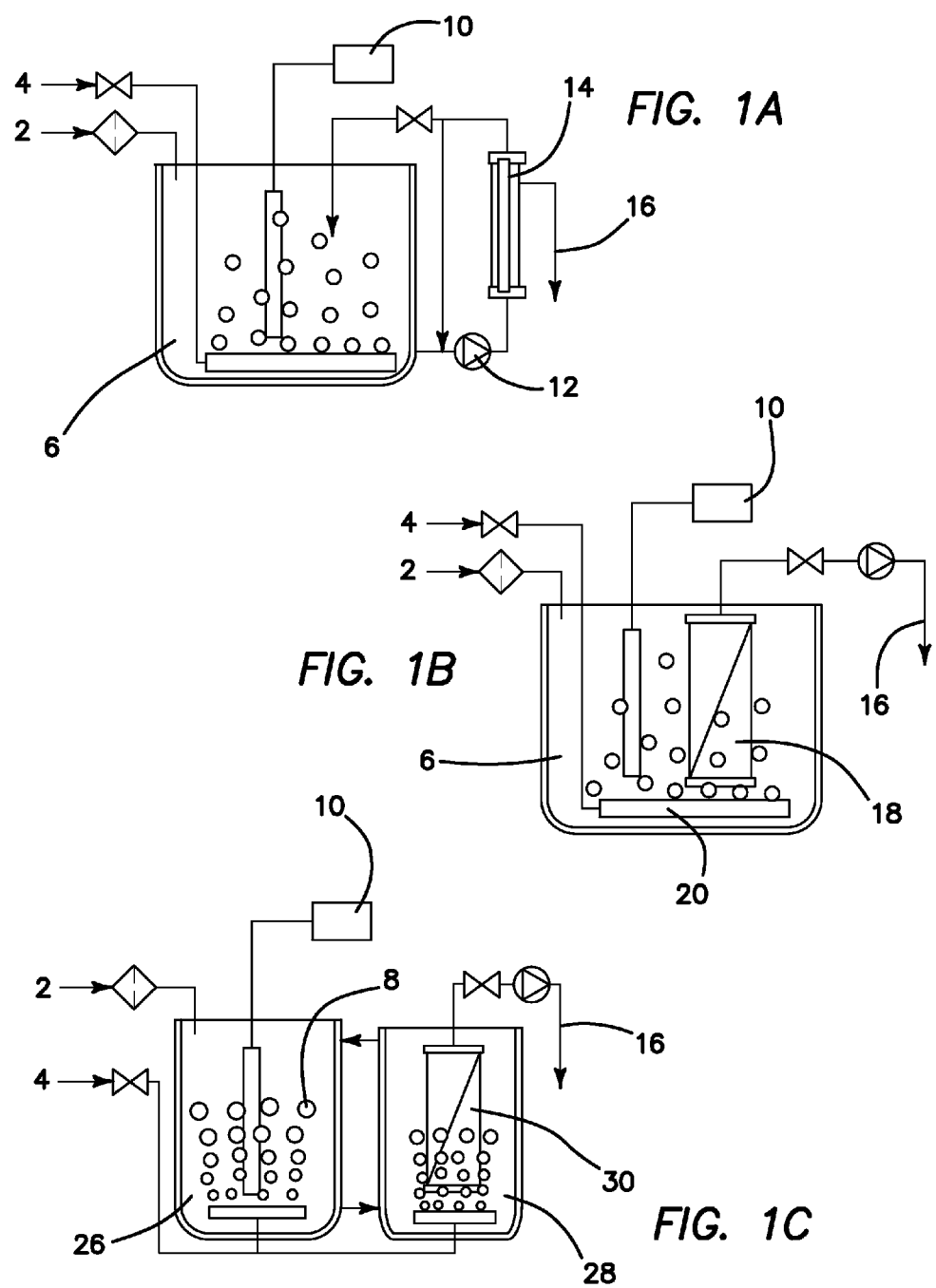
FIG. 1 is a schematic illustration of some MBR reactor configurations that could be used in the present invention.

FIG. 1 illustrates examples of conventional MBR systems that may be employed in the present invention. In typical operation, water to be purified (2) and air or oxygen (4) pass into reactor (6) where air (or oxygen) bubbles (8) pass through the water. Process control is schematically indicated at (10). In a side-stream configuration (top), water is pumped (12) through an external membrane module (14) and purified effluent (16) passes out of the MBR system. In the immersed configuration (middle) a membrane module (18) is immersed within the same vessel as the bubbler (20). In the airlift configuration (bottom), water from the first reactor (26) is passed to second reactor (28) containing membrane module (30). In the airlift system flow is (optionally) circulated between the reactors.

Figure 2:
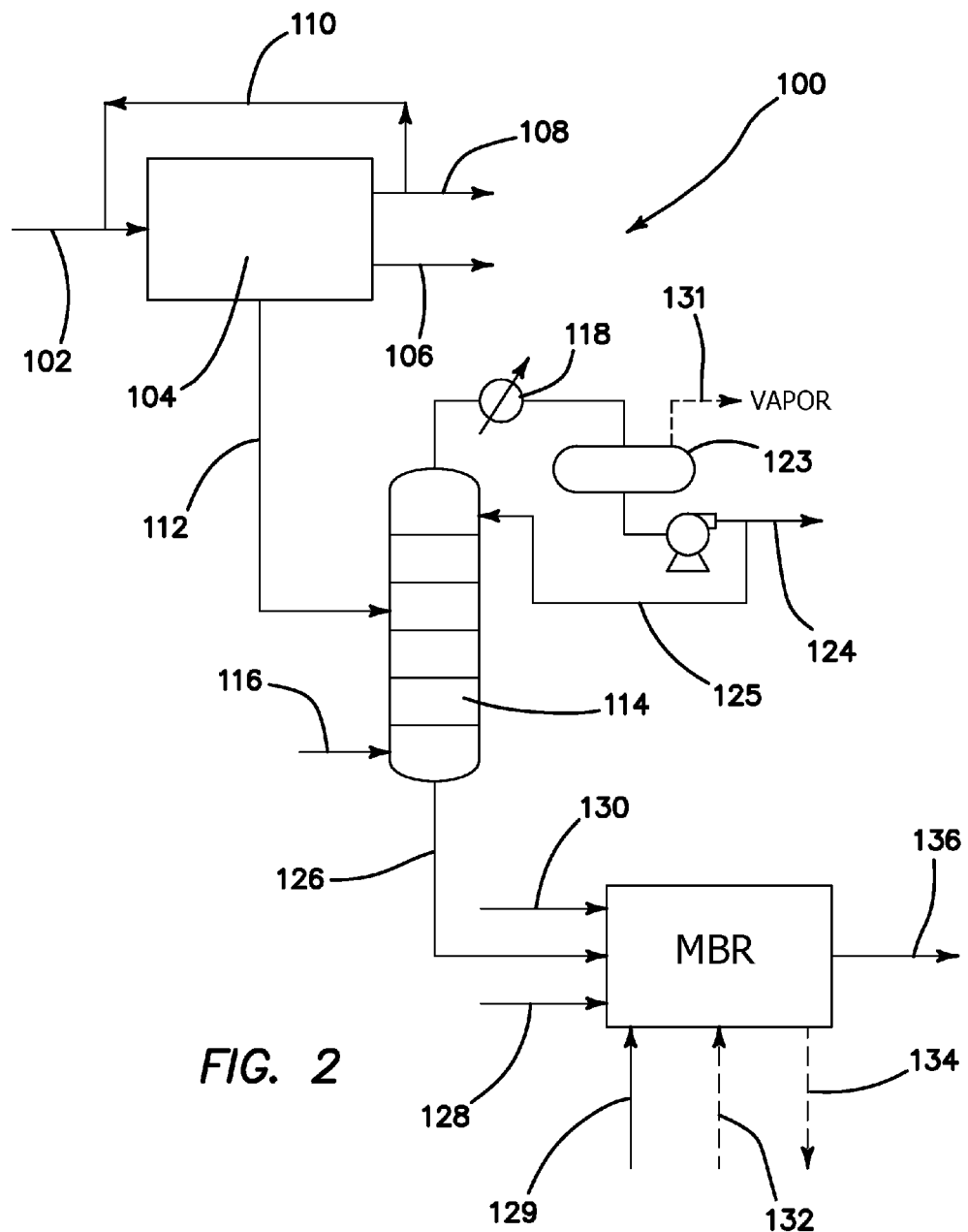
FIG. 2 is a simplified flow diagram for processing FT produced water according to some embodiments of the invention.

A flow diagram of an overall process (100) is illustrated in FIG. 2. To begin the process, syngas (102) passes into a Fischer-Tropsch reactor (104) producing organic liquid and solid products (106), tail gas (108) (which may be recycled (110)) and FT produced water (112). The FT water is stripped in stripper (114) in which a stripping vapor or gas (116) contacts the water (112) and the overhead stream passes out of the top of stripper 114 and flows through a condenser (118) which is used to cool and either completely or partially condense the overhead stream. The stream then passes into optional reflux drum 123 where vapor (if present) may optionally be removed via outlet 131. In preferred embodiments the condensed liquid is a single liquid phase and remains a single liquid phase in the reflux drum. The condensed fraction of the overhead stream is divided into a reflux stream (125) and a distillate product containing water and at least some of the stripped organics (124), which can be sent for further separation or recovery of products. The reflux stream is recycled to the stripper. The stripped water, or bottoms fraction of the stripper (126), can then be passed to the MBR, with or without further treatment in a dissolved air separation (DAF) process for oil removal. Nutrients (128, 129) and alkaline agent (typically sodium or potassium hydroxide) (130) can be added to the stripped water either before and/or after addition to the MBR. Cleaning fluid (132) can be passed into the reactor (typically taking one train out of service for cleaning) and removed (134). Purified water (136) exits the system for any desired use.

In some preferred aspects of the invention, some or all of the water created in the FT process is subjected to a stripping operation. In some preferred aspects, the stripper pressure is slightly above atmospheric pressure and the temperature of the mixture at any point in the column will be at the mixture bubble point. In some preferred aspects, the stripping can be done by flowing the FT water down a column with packing or trays, with the stripping fluid (e.g. injection of live (i.e., pressurized) steam, nitrogen, air, or other available gases or vapour) in counter-current contact. Alternatively, heat may be supplied to the stripper by reboiling a portion of stripped water. Alternatively, or in addition, the water could be distilled; however, stripping is preferred. The stripping may be done under vacuum or slightly above atmospheric pressure (for example, 0.1-10 atm). The temperature will be below the boiling temperature of the FT water. The mass ratio of stripping medium to FT water may be 0.001 to 0.5, more preferably 0.01 to 0.2.

Water created in an FT process conducted at contact times of 5 seconds or less, more preferably 2 s or less or is or less and/or short diffusion distances (e.g. FT catalyst coating thickness of 100 μm or less, or FT catalyst particle size of 1,000 microns or less, or less than 500 microns or less) can be superior to water created by conventional FT or many other industrial waste water compositions. Advantages of the created water obtained as described herein may include one or more of the following features: very low concentration of aromatics (e.g., 10 ppm or less); low aldehyde concentration, and wherein the carbon present in the water is nearly exclusively (e.g., at least 90% by mass, or at least 95% by mass, or at least 98% by mass, or at least 99% by mass) in the form of biodegradable acids (e.g., formic, acetic, propionic, n-butyric, n-valeric, and caproic), or alcohols (e.g., methanol, ethanol, propanol, butanol, decanol).

FT processes that are conducted in microchannels comprising an FT catalyst and/or at short contact times with an FT catalyst are especially desirable since such processes result in a superior mix of components dissolved in the FT produced water as compared to conventional FT processes. Further, the mixture of oxygenated species in these short contact time FT processes enable simple water treatment using this invention without requiring the need for stripping columns required for more difficult separations. The FT produced water in this invention may be processed in a simple stripper which does not require either (1) a side draw of vapor or liquid from the stripper or (2) liquid-liquid phase separation of the condensed overhead stream. The stripper may be operated such that the composition of the distillate product is the same as the composition of the reflux. For purposes of the present invention, a microchannel is defined as a channel having at least one internal dimension of 10 mm or less; in some preferred embodiments 5 mm or less. In preferred embodiments, the FT reaction is conducted through a planar array of microchannels that are adjacent to a planar array of coolant channels. Short contact times are preferably less than 5 second, more preferably less than 500 msec, and in some embodiments in the range of 150 to 500 ms.

While this process is useful for microchannel reactors, the methods provide significant advantages for any FT process, whether using a conventional reactor or not. There is a particular advantage for small-scale facilities that produce 15,000 barrels per day (BPD) or less, preferably 5000 BPD or less, of FT liquids and solids. The reason for this advantage is that at the small scale of the facility, scaling down prior art waste water treatment processes is difficult and costly. There is a need to have a very simple waste water treatment process that can be built using modular construction. The stripper and the membrane reactor and associated equipment can be built on modular structures in separate facilities and transported to the site by truck, rail, or shipping. These systems can be used to avoid construction associated with conventional waste water treatment processes, such as waste water ponds using concrete structures or in-ground retention ponds with liners. For these reasons, the invention is also useful for treating FT water for grassroots facilities or facilities in remote locations where it is difficult to integrate the waste water treatment with existing facilities, such as an existing refining waste water treatment facility. Thus, the invention includes modular components for the FT process and/or water treatment including the MBR and other components. The invention also includes a kit for transporting the modular components. With this in mind, the invention is useful for any FT reactor type, whether conventional (slurry or fixed bed) or a new technology such as compact, structured reactors, including microchannel reactors.

The Fischer-Tröpsch Process

Examples of Fischer-Tröpsch processes suitable for use in the present invention are described in U.S. Pat. Nos. 9,023,900, 7,935,734 US Published Patent Application No. 2014/0045954 and WO2012107718 which are incorporated herein by reference. The following are some non-limiting descriptions of some preferred embodiments of the FT process that can be used for creating water in conjunction with the present invention.

Suitable apparatus for conducting the FT process is known in the prior art. Preferred apparatus are microchannel reactors. A microchannel reactor may be made of any material that provides sufficient strength, dimensional stability and heat transfer characteristics to permit operation of the desired process. These materials may include aluminum; titanium; nickel; platinum; rhodium; copper; chromium; alloys of any of the foregoing metals; brass; steel (e.g., stainless steel); quartz; silicon; or a combination of two or more thereof. Each microchannel reactor may be constructed of stainless steel with one or more copper or aluminum waveforms being used for forming the channels. In preferred embodiments, the FT reactor is not a fluidized bed reactor.

The FT reactor may comprise a plurality of plates or sheets in a stack defining a plurality of Fischer-Tropsch process layers and a plurality of heat exchange layers, each plate or sheet having a peripheral edge, the peripheral edge of each plate or shim being welded to the peripheral edge of the next adjacent plate or shim to provide a perimeter seal for the stack. Some preferred construction techniques are shown in U.S. application Ser. No. 13/275,727, filed Oct. 18, 2011, which is incorporated herein by reference.

The FT reactor may be constructed using waveforms in the form of corrugated inserts. These corrugated sheets may have corrugations with right-angles and may have rounded edges rather than sharp edges. These inserts may be sandwiched between opposing planar sheets or shims. In this manner the channels may be defined on three sides by the corrugated insert and on the fourth side by one of the planar sheets. The process microchannels as well as the heat exchange channels may be formed in this manner. FT reactors made using waveforms are disclosed in U.S. Pat. No. 8,720,725, which is incorporated herein by reference.

The FT reactor may comprise at least one process channel in thermal contact with a heat exchanger, the catalyst being in the process channel. The reactor may comprise a plurality of process channels and a plurality of heat exchange channels, the catalyst being in the process channels.

The catalyst is preferably in the form of particulate solids. These particulates can be packed into parallel arrays of small channels (typically having a width and/or height dimension of 1 cm or less, preferably 1 mm to 1.0 cm, and any length, for example lengths of 50 cm or 1 m or greater) that are interleaved with parallel arrays of heat exchange channels. Alternatively, the catalyst may be coated on interior walls of the process channels or grown on interior walls of the process channels. The catalyst may be supported on a support having a flow-by configuration, a flow-through configuration, or a serpentine configuration. The catalyst may be supported on a support having the configuration of a foam, felt, wad, fin, or a combination of two or more thereof. The catalyst may comprise a coating on a monolith, including monoliths that may be separately inserted or removed from the reactor.

In one preferred process for conducting a Fischer-Tropsch reaction, a reactant mixture in a reactor flows in contact with a catalyst to form a product comprising at least one higher molecular weight hydrocarbon product. Preferably, the catalyst is derived from a catalyst precursor comprising cobalt, optionally a promoter such as Pd, Pt, Rh, Ru, Re, Ir, Au, Ag and/or Os, and a surface modified support, wherein the surface of the support is modified by being treated with titania, zirconia, magnesia, chromia, alumina, silica, or a mixture of two or more thereof. FT processes with short contact times are enabled by high cobalt catalyst loadings, such as catalyst with greater than 20 mass %, more preferably greater than 25%, 35%, or greater than 50 mass % cobalt loading. The product further comprises a tail gas, and at least part of the tail gas can be separated from the higher molecular weight hydrocarbon product and combined with fresh synthesis gas to form a reactant mixture, the volumetric ratio of the fresh synthesis gas to the tail gas in the reactant mixture being in the range from about 1:1 to about 10:1, or from about 1:1 to about 8:1, or from about 1:1 to about 6:1, or from about 1:1 to about 4:1, or from about 3:2 to about 7:3, or about 2:1; the reactant mixture comprising $H_2$ and CO, the mole ratio of $H_2$ to CO in the reactant mixture based on the concentration of CO in the fresh synthesis gas being in the range from about 1.4:1 to about 2:1 or from about 1.5:1 to about 2.1:1, or from about 1.6:1 to about 2:1, or from about 1.7:1 to 1.9:1.

In some preferred embodiments, all water produced in the FT process is collected in a separator, vessel, or tank, and the full flow is subjected to stripping, prior to subsequent use and/or treatment in an MBR.

The MBR reactor should not be configured with long stretches of plug flow. This is because, in plug flow, the pH will rise as the acids are consumed by the microorganisms. Instead, mixing should be permitted such that pH remains similar throughout the MBR's volume. In one embodiment, a MBR can be run with a F:M of 0.05 to 0.5, a sludge age of 5 to 50 days, a pH in the range of 5 to 9; a temperature in the range of 20 to 40 C, and a conductivity of 50 to 1500 µS/cm.

Except for the specified conditions mentioned herein, conditions in the MBR are conventional. For example, the membranes can be removed and washed with dilute sodium hypochlorite, as is conventional in the art. Microorganisms can be sourced from any municipal or industrial activated sludge plant. The bacteria will adapt over time to the feed source, and produce a simple, readily biodegradable waste which is suitable for most heterotrophic and indeed autotrophic bacteria. There is no need for a special source of microbes. Preferably, the MBR should be run at steady state conditions meaning constant feed rate, constant sludge age, constant pH and so on; avoiding large swings in operating conditions.

The overall process is typically considered to be continuous, but in typical commercial operation, plural MBRs will operate in parallel, and each MBR will be brought down from time-to-time for cleaning of the membranes. During this period, the total flow will be accommodated within the online MBR's, although at slightly higher hydraulic load.

Since the FT produced water lacks nutrients, nutrients will need to be added for the microorganisms. In a preferred embodiment, nitrate, potassium, calcium, magnesium, manganese, sodium, iron, copper, zinc, molybdenum, nickel, and cobalt are added. For example, one preferred nutrient mix comprises ammonium nitrate, potassium nitrate, calcium nitrate, magnesium nitrate, manganese chloride, iron chloride, copper chloride, zinc chloride, nickel chloride, cobalt chloride and sodium molybdate.

EXAMPLES

Described below is project aimed to establish the efficiency of treating FT produced water in an MBR. Two MBR pilot plants were employed, one fed with an analogue and the other with FT produced water which was stripped of the volatile fraction. Both treatability (in terms of COD removal) and performance are assessed based on the COD removal and sustainable flux under different operating conditions.

1 Materials and Methods 1.1 FT Produced Water

Around 2000 L of FT produced water (Table 1-1) was shipped from pilot GTL facility in Ohio, US. Samples were collected from separators and contained COD concentration of 25-30 g/l and pH 3.3. About 75% of the COD is made up by methanol and ethanol.

The absence of minerals in the FT produced water, including nitrogen and phosphorus (N & P) demanded dosing with micro-nutrients to sustain biomass growth (Tchobanoglous et al, 2004). For the smaller MBR pilot plant, a nutrient mix was prepared (Table 1-2) and blended the feed water. For the larger plant, a commercial nutrient mix was used and dosed into the dilution water. Since there was no natural pH buffering, a small dose of caustic soda was added to the feed to provide a sodium bicarbonate buffer in the bioreactor.

TABLE 1-1

FT produced water Composition

| Composition | mg/L |
|---|---|
| COD | 30100 |
| PH 3.29 | |
| TOC | 6600 |
| DI-Ethyl-Ketone | 181 |
| Alcohols c1-c10 | |
| Butanol | 446 |
| Decanol | 5.4 |
| Ethanol | 2450 |
| Heptanol | 28 |
| Hexanol | 94.2 |
| Methanol | 7780 |
| Nonanol | 5.2 |
| Octanol | 10.2 |
| Pentanol | 251 |
| Propanol | 690 |
| Organic acids | |
| Acetic acid | 261 |
| Propionic acid | 20.4 |
| Formic Acid | 108 |
| n-Butyric acid | 22.8 |
| n-Valeric acid | 23.6 |
| Caproic acid | 19.4 |
| Aldehydes | |
| Acetaldehyde | <10 |
| Butyraldehyde | <10 |
| Glutaraldehyde | <10 |
| Glutaraldehyde | <10 |
| Isobutyraldehyde | <10 |
| Propionaldehyde | <10 |
| Formaldehyde | <10 |
| | ug/L |
| VOC | |
| 2-Butanone | 8620 |
| Acetone | 52300 |
| DEK | 181 |
| M,P-Xylene | 8.3 |
| Styrene | 4.9 |

TABLE 1-1-continued

FT produced water Composition

| Composition | |
|---|---|
| Strene | 2.4 |
| o-Xylene | 5.4 |

TABLE 1-2

SMBRs Nutrient Composition (mg/g dry solid)

| Composition | mg |
|---|---|
| N | 104 |
| Mo | 0.0048 |
| Cu | 0.024 |
| Co | 0.00048 |
| Ni | 0.001 |
| Mn | 0.1 |
| Zn | 0.2 |
| Fe | 2.4 |
| P | 21 |
| Mg | 8 |
| K | 12 |
| S | 25 |
| Ca | 12 |

In some preferred embodiments, the nutrient composition can be defined as having each element within 50% to 200% of the concentrations shown in Table 1-2.

Examples of FT produced water made using a short contact time FT process are shown in the Tables below:

TABLE 3

Example FT reaction water composition

| Component | Units | Normal load | Peak load |
|---|---|---|---|
| Acetone | mg L$^{-1}$ | 28 | 53 |
| Methyl ethyl ketone | mg L$^{-1}$ | 5.0 | 8.7 |
| Diethyl ketone | mg L$^{-1}$ | 0.0 | 0.2 |
| Benzene | µg L$^{-1}$ | 1.3 | 0.0 |
| Toluene | µg L$^{-1}$ | 8.8 | 2.4 |
| Xylene | µg L$^{-1}$ | 4.6 | 14 |
| Styrene | µg L$^{-1}$ | 0.0 | 5.0 |
| Acetaldehyde | mg L$^{-1}$ | 10 | 0.0 |
| Formic acid | mg L$^{-1}$ | 78 | 108 |
| Acetic acid | mg L$^{-1}$ | 478 | 261 |
| Propionic acid | mg L$^{-1}$ | 86 | 20 |
| Butyric acid | mg L$^{-1}$ | 76 | 23 |
| Valeric acid | mg L$^{-1}$ | 76 | 24 |
| Hexanoic acid | mg L$^{-1}$ | 54 | 20 |
| Methanol | mg L$^{-1}$ | 4038 | 7779 |
| Ethanol | mg L$^{-1}$ | 1935 | 2450 |
| Propanol | mg L$^{-1}$ | 460 | 690 |
| n-Butanol | mg L$^{-1}$ | 232 | 446 |
| n-Pentanol | mg L$^{-1}$ | 163 | 251 |
| n-Hexanol | mg L$^{-1}$ | 80 | 94 |
| n-Heptanol | mg L$^{-1}$ | 40 | 28 |
| n-Octanol | mg L$^{-1}$ | 9.2 | 10 |
| n-Nonanol | mg L$^{-1}$ | 5.8 | 5.0 |
| n-Decanol | mg L$^{-1}$ | 0.0 | 5.4 |
| TPH | mg L$^{-1}$ | 7.1 | 7.1 |

TABLE 4

Example FT reaction water composition

| Component | Units | Normal load | Peak load |
|---|---|---|---|
| Acetone | mg L$^{-1}$ | 28 | 53 |
| Methyl ethyl ketone | mg L$^{-1}$ | 5.0 | 8.7 |

TABLE 4-continued

Example FT reaction water composition

| Component | Units | Normal load | Peak load |
|---|---|---|---|
| Diethyl ketone | mg $L^{-1}$ | 0.0 | 0.2 |
| Benzene | µg $L^{-1}$ | 0.0 | 1.3 |
| Toluene | µg $L^{-1}$ | 2.4 | 8.8 |
| Xylene | µg $L^{-1}$ | 4.6 | 14 |
| Styrene | µg $L^{-1}$ | 0.0 | 5.0 |
| Acetaldehyde | mg $L^{-1}$ | 0.0 | 10 |
| Formic acid | mg $L^{-1}$ | 101 | 129 |
| Acetic acid | mg $L^{-1}$ | 365 | 479 |
| Propionic acid | mg $L^{-1}$ | 44 | 79 |
| Butyric acid | mg $L^{-1}$ | 39 | 64 |
| Valeric acid | mg $L^{-1}$ | 37 | 62 |
| Hexanoic acid | mg $L^{-1}$ | 26 | 41 |
| Methanol | mg $L^{-1}$ | 8900 | 11782 |
| Ethanol | mg $L^{-1}$ | 3088 | 3821 |
| Propanol | mg $L^{-1}$ | 954 | 1411 |
| n-Butanol | mg $L^{-1}$ | 593 | 803 |
| n-Pentanol | mg $L^{-1}$ | 336 | 456 |
| n-Hexanol | mg $L^{-1}$ | 118 | 154 |
| n-Heptanol | mg $L^{-1}$ | 61 | 88 |
| n-Octanol | mg $L^{-1}$ | 20 | 31 |
| n-Nonanol | mg $L^{-1}$ | 9.4 | 15 |
| n-Decanol | mg $L^{-1}$ | 7.7 | 15 |
| TPH | mg $L^{-1}$ | 7.1 | 7.1 |

Water compositions may be determined by GC/mass spectrometry or other appropriate techniques. Care should be taken to avoid vaporization during sampling. It is believed that the values in Table 4 are more accurate than the values in Table 3.

1.2 Small MBR (SMBR)

1.2.1 Bench Scale Setup

Figure 3:
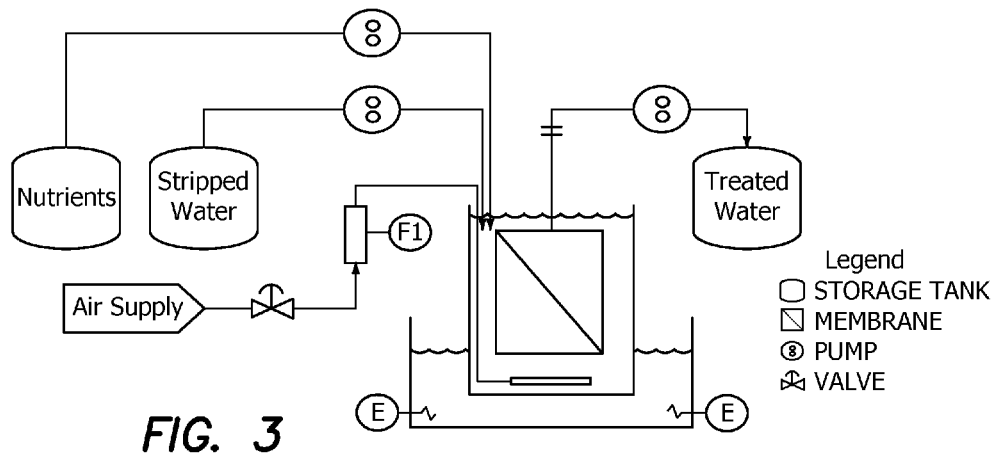
FIG. 3 is a schematic diagram of the apparatus for conducting the first example.
Figure 4:
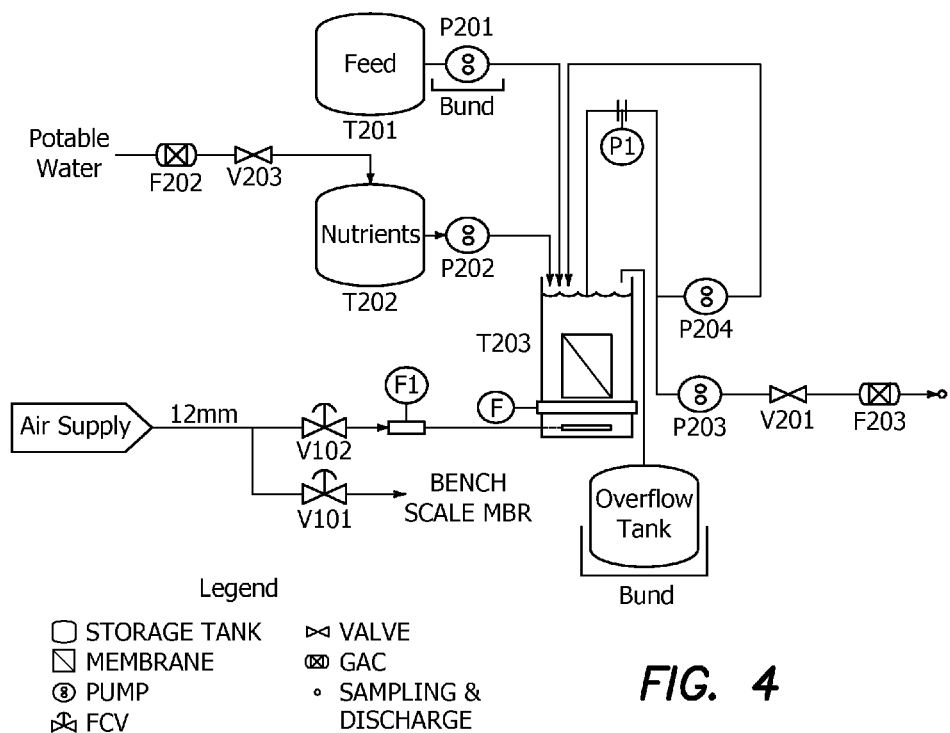
FIG. 4 illustrates a schematic diagram of the apparatus used in the pilot plant example.

The small MBR (FIG. 3) had a nominal 4 L capacity tank and was fitted with a single 0.1 m² flat sheet (FS) microfiltration (MF) membrane panel (Kubota, London, UK). The temperature of the MBR was controlled at around 30° C. using a glass tube heater immersed in the water bath. Aquarium-style air stones were used to deliver 10 L/min of aeration to obtain a target minimum dissolved oxygen (DO) concentration of 2 mg/L as periodically monitored using a Hach Lange LDO meter. Peristaltic pumps (Watson Marlow 101U/R) were used to deliver the feed water and nutrient mix as well as discharging of permeate, and were controlled manually. Control and monitoring of flow rate were performed manually.

The raw FT produced water was steam stripped prior to biotreatment to remove the bulk of the volatile organic carbon (VOC) and so reduce the organic load for aerobic degradation. At full-scale this would be conducted using a packed tower stripper. At bench scale, the FT produced water was boiled continuously at 100° C. for an hour to remove the alcohols, to reduce the COD concentration from 25-30,000 mg/L to around 4000 mg/L. It was diluted with deionised water to achieve the desired COD level of 1000-5500 mg/L depending on the desired experimental conditions. A COD of 1,000 mg/l was achievable with boiling alone, but the loss of water by evaporation is high due to the extended boiling period. In a full scale steam stripping column, water loss is avoided by condensing the stripper overheads. This was represented by simply diluting the partially stripped water with deionised water (DI). Nutrient (Table 1-2) was dosed separately to avoid bacterial growth in the feedstock.

The SMBR was seeded with 4 L activated sludge from a bioreactor (an industrial SBR treating bottling plant wastewater) that had been pre-acclimatised to FT produced water. During start-up the MLSS concentration was increased to approximately 10 g/L. The operating conditions were subsequently adjusted (Table 1-5) to sustain different MLSS concentrations and F:M ratios of 0.19-0.3 $d^{-1}$. 0.3 to 0.19 from this project have little impact on the effluent quality and the operation range from 0.17 to 0.32 have shown stability in the MBR performance

TABLE 1-5

SMBR Operating Parameters

| Feed-COD mg/L | MLSS mg/L | F:M | HRT Hours | SRT Days | FLUX LMH |
|---|---|---|---|---|---|
| 2500 | 12000 | 0.1 | 40 | 50 | 1 |
| 5500 | 12000 | 0.3 | 35 | 50 | 1 |
| 4000 | 15000 | 0.2 | 30 | 50 | 1 |
| 3000 | 15000 | 0.25 | 12 | 35 | 3.5 |
| 2000 | 15000 | 0.3 | 12 | 35 | 3.5 |
| 2500 | 17000 | 0.3 | 12 | 35 | 3.5 |
| 1500 | 11000 | 0.25 | 12 | 20 | 3.5 |
| 1200 | 8500 | 0.25 | 12 | 20 | 3.5 |

1.3 Large MBR (LMBR)

1.3.1 Pilot Plant Set-Up

The LMBR had a nominal capacity of 150 L and was fitted with 5 flat sheet MF panels identical to that of the SMBR, providing a total area of 0.5 m². The MBR temperature was controlled at ~30° C. using a heating jacket. A coarse bubble membrane tube air diffuser delivered 100 L/min to sustain a minimum DO of 2 mg/L, as monitored manually. The diffuser was located at the base of the membrane cassette, to provide membrane air scouring of 12 $Nm^3/(h·m^2)$ at 100 l/min as well as provide oxygen for the process. Peristaltic pumps (Watson Marlow 101U/R) were used to pump the feed and draw permeate as with the SMBR. A GAC polishing step was incorporated based on 750 g of Norit GAC 1240W (Steam activation of coal).

The SMBR feedwater comprised a combination of unstripped FT produced water blended with acetic acid, the ratio of FT produced water to Acetic acid was 52:1, recycled permeate and a solution of commercial botanic nutrient (Miracle-Gro), diluted with 200 L of de-chlorinated potable water. For the first 2 months, diluted unstripped FT produced water alone was used as the feed source. After 2 months the feed was supplemented by adding 9 kg of acetic acid and 2.5 kg of propionic acid, both reagent grade, and topping up with tap water. Unstripped FT produced water with and without spiking was diluted to obtain the required COD test concentration. Feed and nutrient were dosed from 2 different tanks, and recycled permeate dosed directly back to the MBR, to avoid cross contamination causing bacterial growth. The LMBR was seeded with activated sludge from a municipal WWTP with MLSS of approximately 7 g/L, and the MLSS subsequently gradually increased to 9 g/L before adjusting further according to the experimental programme (Table 1-6).

TABLE 1-6

LMBR Operating Parameters

| Feed-COD | MLSS | F:M | HRT | SRT | FLUX |
|---|---|---|---|---|---|
| 2000 | 9000 | 0.2 | 18 | NC | 17 |
| 2000 | 12500 | 0.2 | 18 | NC | 17 |
| 2000 | 9000 | 0.2 | 25 | 36 | 11 |
| 2000 | 10000 | 0.2 | 25 | 30 | 11 |

1.4 Membrane Cleaning

Operation was sustained without routine chemical cleaning in place (CIP) and fouling behaviour observed with reference to the pressure, monitored using an analogue vacuum gauge on the pump suction line. Recovery cleaning was performed when the pressure reached 0.3 bar. Membranes were then removed and washed at low pressure with mains water before applying mechanical cleaning with a sponge and then soaking in 1000 mg/L hypochlorite for 30 mins and then rinsing with deionised water.

1.5 Analytical Methods

The Chemical Oxygen Demand (COD) was tested using Merck's Cell Test and Spectroquant Photometer NOVA 60 according to Standard Methods (APHA, 2005). Standard APHA methods were also used to estimate mixed liquor suspended solids (MLSS), mixed liquor volatile suspended solids (MLVSS), total dissolved solids (TDS), Capillary Suction Time (CST) and chlorine demand. The CST readings were obtained using Triton 2000 series CST filterability tester and Triton CST (7×9 cm) filter paper. Chlorine demand was measured using Hach Colorimeter Filter Photometer in combination with Hach DPD Total Chlorine Reagent Powder Pillows, 0.02-2.00 mg/L range.

The GAC isotherm determination employed GAC particles fractioned to 32-106 μm in size at masses of 0.1, 0.5, and 1 g in a 120 mL volume of SMBR permeate. The suspensions were shaken for 6 hours and the solution sampled for residual COD.

As is well known, pH can be measured using conventional metering apparatus and techniques.

3 Results and Discussion 3.1 Water Quality Vs. Retention Time

In the initial phase of SMBR operation the MLSS was allowed to increase to a maximum of 18 g/L at an HRT of 32-42 h. During this period a steady and gradual improvement of COD removal from 97% to 99% was observed when operation was stable (feed COD 3.1-3.9 g/L) and the MLSS between 14 and 16 g/L. The SRT was decreased from 33 days to 20 days to reduce the MLSS to around 8.8 g/L. This resulted in deterioration in COD removal in the short term (22 days) when operating conditions were being changed. However, on returning to steady-state operation of 20 d SRT, 12 h HRT and 1,000-1,200 mg/L COD feed the COD removal increased to >99%.

Figure 5:
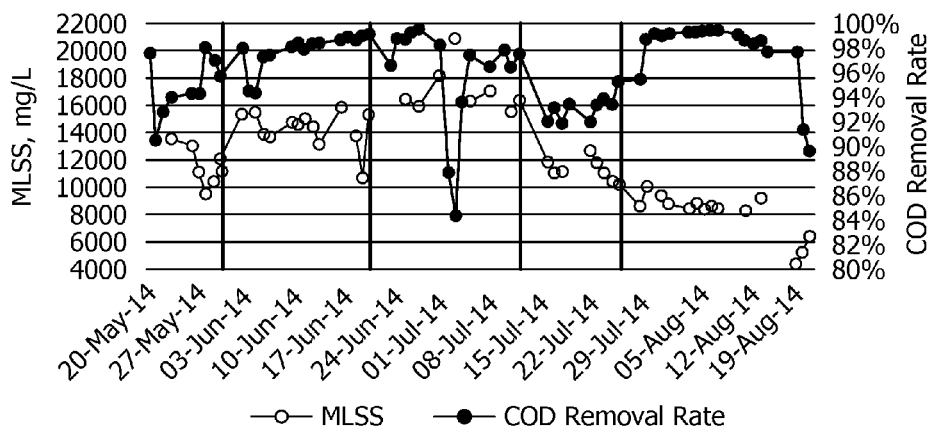
FIG. 5 illustrates COD removal rate (generally upper data points connected by a continuous line) and MLSS (Mixed liquor suspended solids) shown in the generally lower and discontinuous line.
Figure 6:
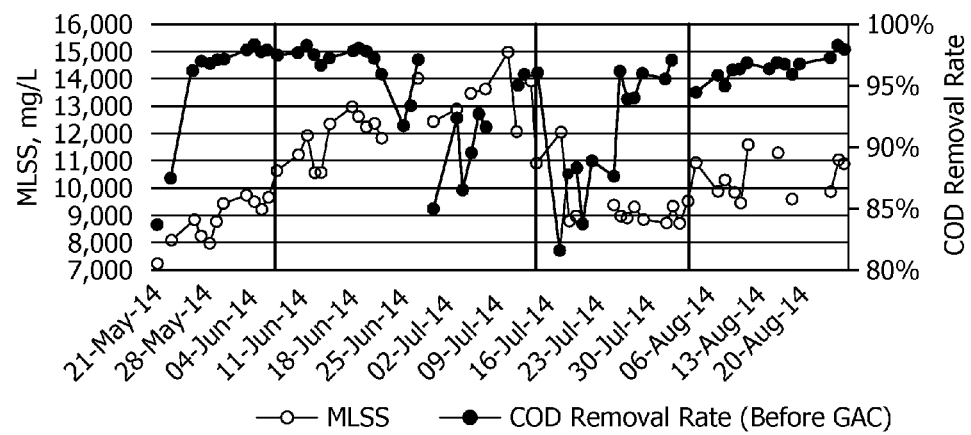
FIG. 6 illustrates COD removal rate (generally upper data points connected by a mostly continuous line) and MLSS (Mixed liquor suspended solids) shown in the generally lower and more discontinuous line.

The LMBR MLSS was increased from 7 g/L to 15 g/L in first month of operation, with no sludge wastage up to 12.5 g/L MLSS at an HRT of 17.5 h. During this initial period the COD removal rate was stable between 97%-98% (FIG. 5). On decreasing the SRT to 20 days and increasing the HRT to 28 h on 15 Jul. 2014, the MLSS decreased to around 10.5 g/L and a significant reduction in COD removal was observed. This coincided with the spiking of the feed with acetic and propionic acids, significantly changing the ratio of alcohols to acids in the feed such that acclimation to the new feed conditions took 2-3 weeks. However, as with the SMBR, the system recovered to produce 98% removal once steady-state conditions had been re-established from 30 July onwards.

Overall COD removal of >99% was demonstrated for the stripped wastewater for steady-state conditions. This corresponded to a COD concentration as low as 5 mg/L in the MBR-treated wastewater. The recorded COD removal data from this study were in line with those from the two other reported FT produced water treatment studies. They are considerably greater than data reported for most of the bench-scale studies and full-scale plant operation (Table 3-1), reflecting the benign nature of FT wastewater compared with other O&G effluents which are generally much more challenging (Table 0-2 and Table 3-1). The COD removal rate for the current study meets the World Bank Group's industry guidelines of 150 mg/L maximum COD (WBG, 2007) for petroleum industry effluents.

Operation of the MBRs was generally disrupted by malfunctions which would not be expected to arise in a full-scale plant. Foremost amongst these was the clogging of the feedwater tubes of the SMBR in particular, causing significant fluctuation in the biotank sludge volume and MLSS concentration. Clogging was caused by both the precipitation of ferric oxide—an unanticipated contaminant in the feedwater—and the formation of biofilms (including algal growth) associated with the nutrient feed dosing. An unusual facet of the biotreatment of the FT wastewater is the pH trend, where the treated wastewater is more alkaline than the feed. Whereas the feed wastewater pH was between 4 and 5, the treated wastewater pH at steady-state (maximum COD removal) was around 8 for the LMBR and 7.5 for the SMBR. This is because the acidity generated by the carboxylic acids in the feed is removed once the acids are degraded.

TABLE 3-1

Case studies Comparison on Petroleum Industry's MBR Parameter and Performance.

| Company | Country/Region | Scale | Effluent Source | Membrane Type | Temp, °C. | Flux, LMH | SRT, Days | HRT, Hrs | MLSS, g/L | COD Feed, g/L | COD Removal | Reference |
|---|---|---|---|---|---|---|---|---|---|---|---|---|
| Sinopec Guangzhou | China | Full | Oil Refining, Ethylene Process | iHF | 20-40 | 8.9 | 30-90 | 15 | 3-8 | 225 | 80% (min) | Judd, 2014 |
| Petrochemical plant, Sichuan | China | Full | Petrochemical | iHF | 15-30 | 16 | 15-30 | 0.33 | 6 | 2500 | 98% (Max) | |
| Formosa, Yunlin | Taiwan | Full | Oil Refining, Petrochemical | iHF | 20-30 | 20-30 | NA | NA | 3.5 | 1000 | 95% | |
| Syndial, Porto Marghera | Italy | Full | Ethylene/PVC Process | iHF | NA | 16-19.8 | 15-30 | NA | 6 | 280 | 58% (min) | |
| Sangachal Terminal, Baku | Azerbaijian | Pilot | Offshore Oil Reserviors | iHF | 15-27 | 13-19.3 | NA | NA | 20 | 4000-50000 | 97% (min) | Rees et al., 2009 |
| TPAO Basin, Trakya | Turkey | Bench | PW | iHF | 20 | 10 | 30-"inf" | $2.7^b$ | 2-16 | 1000-3000 | 67-$83^a$ | Kose et al., 2012 |
| Petrochemical plant | Singapore | Bench | Petrochemical | iFS | 26 | 10-12.5 | 25 | 13-16 | 8.6-9.6 | 720-1590 | 85-$95^d$ | Qin et al., 2007 |
| Petrobras oil refinery | Brazil | Bench | Refinery | iHF | ~25 | 15-17.5 | "inf" | 10.0 | 2.1-10.4 | 400-1050 | 41-67 | Viero et al., 2008 |
| Queensland Energy resources | Australia | Bench | Oil Shale Retort Sour Water | iFS | 25 | 0.6 | N/A | 168-504 | 14-20 | 10,000-30,000 | 75-80% | Lea et al 2013 |
| Sasol Technology, Secunda | South Africa | Pilot | GTL | iFS | 42 | 17 | 35 | 8 | 7.8 | 1800 | 96% | Young et al., 2006 |

3.2 Sludge Quality

SVI and CST were measured for the steady state mixed liquor. The SVI was not measurable, with no visible settling over a 2 hour period for either MBR. The LMBR had a mean CST of 316, ranging between 276 and 372 s over the final 4 weeks of the study. The SMBR CST values varied significantly, progressively increasing from 109 s to 1064 s over the same period. These values are significantly higher than those OF 5-50 s reported for FT produced water (Molipane et al., 2006) but are similar to those reported by Wu et al (2009) for Municipal sludge processed in the simultaneous sludge thickening and digestion reactor. The high CST and SVI values imply that thickening and dewatering of the sludge may be somewhat challenging (Fabregat et al, 2011).

3.3 Membrane Performance

Practical constraints of the study meant that the SMBR flux was very low at ~3.5 LMH, such that no fouling was observed for this MBR throughout the study. The LMBR was, however, designed to permit higher fluxes under more representative operating conditions of 11-17 LMH, albeit with an extremely high membrane air scour rate of around 12 $Nm^3/(h·m^2)$ compared with 0.2-0.8 normally associated with full-scale industrial effluent treatment MBR plants, (Judd, 2014). This flux applied is in line with the values listed in Table 3-1.

The LMBR membrane ran without cleaning for the first month, but then required cleaning after each 7-11 day period of operation when the pressure increased to the threshold maximum value of 0.3 bar. Inspection of the membrane showed that it had clogged (FIG. 3.3) in areas where there was insufficient aeration. Repositioning the membrane aerator significantly ameliorated this problem and in the final 21 days operation at low pressure was sustained without necessitating cleaning. Note that the sludge layer adhering to the membranes was easily removed with gentle water jets. It is clear that the limitations of the design of the module cassette holder contributed to the fouling.

3.4 Post-Treatment

Post-treatment using the GAC contributed only 0.35-1.45% to the total COD removal. The adsorption isotherm measurements indicated that increasing the concentration of GAC from 0.5 to 1 mg/L at the feed concentration of 12 mg/L COD had no impact on the equilibrium COD concentration of 6.4 mg/L COD±10%. It was therefore concluded that GAC was not a viable option for polishing residual dissolved COD, probably reflecting the low molecular weight of the residual organic carbon.

The chlorine demand of the effluent was determined as being 0.4-0.46 mg/L. This means that the water can be disinfected for use as cooling tower make up or other services without incurring excessive costs for chlorination.

Discussion

- For a high COD loading of up to 5500 mg/L a COD removal of over 98% was consistently achieved for both the real and analogue FT produced water, somewhat higher than previously reported values for petroleum industry wastewaters generally. This reflects the highly biodegradable nature of this wastewater, in marked contrast with other oil and gas effluents.
- Significant fluctuations in the F:M ratio did not affect the COD removal rate under conditions of progressively increasing the MLSS concentration.
- A flux of up to 14 LMH was sustained under operating conditions of high but uneven membrane air scour applied despite an extremely high sludge CST value of 275-372—indicating an innately high sludge filtration resistance.
- The low residual COD concentration of 5 mg/L or less attainable under steady-state operating conditions means that the treated effluent is suitable for re-use as cooling water following moderate doses of chlorine (0.4 mg/L chlorine demand) without requiring further polishing.
- The use of a completely mixed reactor permitted partial neutralisation of the feed with caustic soda, reducing the TDS of the effluent and decreasing the blowdown (waste stream) from its reuse for evaporative cooling.
- MBRs would provide a lower-footprint process than the previously applied membrane polishing process (classical activated sludge followed by membrane filtration).

Although the previous patent literature disclosed that pH in the MBR should be maintained between pH 5.5 to 9.5; surprisingly, we discovered that excellent results could be obtained with a relatively low pH of the water prior to addition to the MBR (i.e., the water feed to the MBR). And the use of a lower pH further improves the process by reducing or eliminating the amount of brine that must be disposed. It was also surprising that the pH increased in the MBR since in most industrial wastewater plants, the pH goes down through the treatment process.

REFERENCES

Abdelwahab, O., Amin, N. K. and El-Ashtoukhy, E.-S. Z. (2009). Electrochemical removal of phenol from oil refinery wastewater. *J. Hazard. Mater.* 163 711-716.

Al Zarooni, M. and Elshorbagy, W., (2006). Characterization and assessment of Al Ruwais refinery wastewater. *J. Hazard. Mater.* 136 398-405.

Altas, L. and Büyükgüngör, H. (2008). Sulfide removal in petroleum refinery wastewater by chemical precipitation. *J. Hazard. Mater.* 153 462-469.

APHA Standard Methods, $21^{st}$., method 5220 D (2005)

Coelho, A., Castro, A. V., Dezotti, M. and Sant'Anna Jr., G. L. (2006). Treatment of petroleum refinery sourwater by advanced oxidation processes. *J. Hazard. Mater.* 137 178-184.

Demirci, S., Erdogan, B., Ozcimder, R. (1997). Wastewater treatment at the petroleum refinery Kirikkale Turkey using some coagulant and Turkiskh clays as coagulant aids. *Water Res.* 32 3495-3499.

Di Fabio S., Malamis, S., Katsou, E., Vecchiato, G., Cecchi, F. and Fatone, F. (2013). Optimization of membrane bioreactors for the treatment of petrochemical tastewater under transient conditions. *Chem. Eng. Trans.* 32 7-11.

Dos Santos, A. B., Cervantes, F. J., and Van Lier, J. B. (2007). Review paper on current technologies for decolourisation of textile wastewaters: Perspectives for anaerobic technologies. *Bioresource Technol.* 98 2369-2385

El-Naas, M. H., Al-Zuhair, S. and Alhaija, M. A. (2009). Reduction of COD in refinery wastewater through adsorption on date-pit activated carbon. *J. Hazard. Mater.* 173 750-757.

Fakhru'l-Razi A., Pendashteh A., Abdullah L. C., Biak D. R. A., Madaeni S. S. and Abidin Z. Z. (2009). Review of technologies for oil and gas produced water treatment, *J. Hazard. Mats.* 170 530-551.

Fabregat A., Bengoa C., Font J. and Frank Stueber F. (2011) Reduction, Modification and Valorisation of Sludge Removals (*Eu Report*). IWA Publishing.

Jou, C. G. and Huang, G. (2003). A pilot study for oil refinery wastewater treatment using a fixed film Bioreactor. *Adv. Environ. Res.* 7 463-469.

Kose B., Ozgun, H., Ersahin, M. E., Dizge, N., Koseoglu-Imer, D. Y., Atay, B., Kaya, R., Altinbas, M., Sayili, S., Hoshan, P., Atay, D., Eren, E., Kinaci, C. and Koyuncu. I. (2012). Performance evaluation of a submerged membrane bioreactor for the treatment of brackish oil and natural gas field produced water. *Desalination* 285 295-300.

Lea G., Doyle J., ramsay I. (2004). Treatability Studies on Oil Shale Retort Sour Water, Presented at Ozwater '13, Perth, Australia.

Lin H., Gao, W., Meng F., Liao, B. Q, Leung, K. T., Zhao, L., Chen, J. and Hong, H. (2012). Membrane Bioreactors for Industrial Wastewater Treatment: A Critical Review. *Crit. Revs. Environ. Sci. Technol.* 42 677-740.

Ma, F., Guo, J.-B., Zhao, L.-J., Chang, C.-C. and Cui, D. (2009). Application of bioaugmentation to improve the activated sludge system into the contact oxidation system treating petrochemical wastewater. *Bioresour. Technol.* 100 597-602.

Ojuola, E. A. and Onuoha, G. C. (1987). The effect of liquid petroleum refinery effluent on fingerlings of Sarotherodon melanotheron (Ruppel 1852) and *Oreochromis niloticus* (Linnaeus 1757). FAO Corporate Document Repository, Project RAF/82/009.

Pendashteh A. R., Fakhru'l-Razi A., Chuah T. G., Dayang Radiah A. B., Madaenic S., Zurina Z. A. (2010). Biological treatment of produced water in a sequencing batch reactor by a consortium of isolated halophilic microorganisms. *Environ. Technol.* 31(11) 1229-1239.

Pendashteh, A. R., Abdullaha, L. C., Fakhru'l-Razi, A., Madaenic, S. S., Abidin, Z. Z. and Biak, D. R. A. (2012). Evaluation of membrane bioreactor for hypersaline oily wastewater treatment. *Proc. Safety Environ. Protect.* 90 45-55.

Qin J.-J., Oo, M. H., Tao, G. and Kekre, K. A. (2007). Feasibility study on petrochemical wastewater treatment and reuse using submerged MBR. *J. Membrane Sci.* 293(1-2) 161-166.

Rahman M. M. and Al-Malack., M. H. (2006). Performance of a crossflow membrane bioreactor (CF-MBR) when treating refinery wastewater. *Desalination* 191(1-3) 16-26.

Saien, J., and Nejati, H. (2007). Enhanced photocatalytic degradation of pollutants in petroleum refinery wastewater under mild conditions. *J. Hazard. Mater.* 148 491-495.

Scholz W. and Fuchs, W. (2000). Treatment of oil contaminated wastewater in a membrane bioreactor. *Water Res.* 34(14) 3621-3629.

Serafim, A. J. (1979). Solid Retention Time on Carbon Adsorption of Organics in Secondary Effluents from Treatment of Petroleum Refinery Waste. PhD Thesis, Texas A&M University.

Sharghi E. A., Bonakdarpour B., Roustazade P., Amoozegarb M. A., and Rabbani A. R. (2013). The biological treatment of high salinity synthetic oilfield produced water in a submerged membrane bioreactor using a halophilic bacterial consortium *J. Chem. Technol. Biotechnol.* 88 2016-2026.

Tchobanoglous, G., Burton, F. L. and Stensel, H. D. (2004). Wastewater Engineering: Treatment and Reuse, 4 edn., Metcalf & Eddy Inc., New York, McGraw Hill.

Viero A. F., T. M. de Melo, A. P. R. Torres, N. R. Ferreira, G. L. Sant'Anna Jr., C. P. Borges, V. M. J. Santiago. 2008. The effects of long-term feeding of high organic loading in a submerged membrane bioreactor treating oil refinery wastewater, *J. Membrane Sci.* 319 223-230.

World Bank Group (1999). Pollution Prevention and Abatement Handbook, The World Bank (Washington).

World Bank Group (2007). Environmental, Health, and Safety Guidelines for Petroleum Refining (Washington)

Upgrading Of A Petrochemical Effluent Using Membrane Bioreactor (MBR) Technology WHO. Guidelines for drinking-water quality, Vol. 2. Health criteria and other supporting information. 2nd ed. Geneva: World Health Organization; 1996.

Wu, Z., Wang, X., Wang, Z. and Du, X. (2009), "Identification of sustainable flux in the process of using flat-sheet membrane for simultaneous thickening and digestion of waste activated sludge", *Journal of hazardous materials*, vol. 162, no. 2-3, pp. 1397-1403.

Young T, Molipane, N. P., Kennedy S, Phillips T D, Augustyn M P, G H du Plessis (2006). *Sasol Technology Pty (Ltd)*; Research & Development, Water and Effluent Technology Research, Secunda Zhidong L. (2010). Integrated submerged membrane bioreactor anaerobic/aerobic (ISMBRA/O) for nitrogen and phosphorus removal during oil refinery wastewater treatment. *Petroleum Sci. Technol.* 28 286-293.

Zhidong, L., Na, L., Honglin, Z. and Dan, L. (2009). Study of an A/O submerged membrane bioreactor for oil refinery wastewater treatment. *Petroleum Sci. Technol.* 27(12) 1274-1285.

What is claimed:

1. A method of treating water produced by a Fischer-Tropsch process, comprising:
    obtaining water produced by a Fischer-Tropsch process having a pH of 5.0 or less and having carboxylic acids and alcohols dissolved in the water;
    adding sufficient alkalinity to the water to ensure that the pH of the water is in a range of 4.2 to 5.8;
    adding at least a portion of the water having a pH in the range of 4.2 to 5.8 to a membrane bioreactor (MBR) wherein the water is treated with oxygen by aeration in the presence of bioorganisms to reduce the concentration of organic carbon in the water, thus resulting in purified water; and
    removing at least a portion of the purified water from the MBR.

2. The method of claim 1, comprising: conducting the Fischer-Tropsch process in a microchannel reactor.

3. The method of claim 1, comprising: subjecting the water produced in the Fischer-Tropsch process to a stripping operation prior to the step of adding sufficient alkalinity to the water.

4. The method of claim 3, where there is no side draw of vapor in the stripping operation.

5. The method of claim 3, wherein an overhead stream is collected from the stripper and condensed, and wherein there is no liquid-liquid phase separation of the overhead stream.

6. The method of claim 1, wherein just prior to adding the sufficient alkalinity, the pH of the water is in the range of 2.0 to 4.1, or in the range of 3.5 to 4.0.

7. The method of claim 1, wherein the alkalinity comprises NaOH, or KOH, or $Na_2CO_3$ or $K_2CO_3$.

8. The method of claim 1, wherein sufficient alkalinity is added to the water to ensure that the pH of the water is in a range of 4.5 to 5.5 or in the range of 4.7 to 5.3.

9. The method of claim 1, wherein flow in the membrane bioreactor (MBR) is mixed and not principally plug flow.

10. The method of claim 1, wherein the purified water resulting from the process is used without reverse osmosis.

11. The method of claim 1, wherein the purified water resulting from the process is used without any other further treatment.

12. The method of claim 11, wherein the process does not result in any salty brine; and wherein the total dissolved salts in the purified water resulting from the process are in the range 100 to 300 mg/l.

13. The method of claim 1, wherein the purified water resulting from the process, without further treatment, is used to cool a process stream in a cooling tower.

14. The method of claim 1, wherein all of the water is adjusted to be in the range of 4.2 to 5.8 and is added to the membrane bioreactor (MBR); and all of the water is removed from the MBR with a pH range of 6.5 to 8.0.

15. The method of claim 1, wherein the process is conducted in a continuous fashion.

16. The method of claim 1 wherein a nutrient mix comprising: N, Mo, Cu, Co, Ni, Mn, Zn, Fe, P, Mg, K, S, and Ca is added to the membrane bioreactor (MBR).

17. An aqueous composition made by the process of claim 1.

18. The method of claim 1, wherein the purified water resulting from the process is used without any further treatment to remove dissolved salt.

19. The method of claim 1, wherein the Fischer-Tropsch process is conducted at a contact time of 5 seconds or less.

20. A method of treating water produced by a Fischer-Tropsch process, consisting essentially of:
- obtaining water produced by a Fischer-Tropsch process having a pH of 5.0 or less and having carboxylic acids and alcohols dissolved in the water;
- adding sufficient alkalinity to the water to ensure that the pH of the water is in a range of 4.2 to 5.8;
- optionally subjecting the water produced in the Fischer-Tropsch process to a stripping operation prior to the step of adding sufficient alkalinity to the water;
- adding at least a portion of the water having a pH in the range of 4.2 to 5.8 to a membrane bioreactor (MBR) wherein the water is treated with oxygen by aeration in the presence of bioorganisms to reduce the concentration of organic carbon in the water, thus resulting in purified water; and
- removing at least a portion of the purified water from the MBR.

* * * * *